(12) United States Patent
Moriyama

(10) Patent No.: US 10,589,558 B2
(45) Date of Patent: Mar. 17, 2020

(54) INK JET IMAGE FORMING METHOD

(71) Applicant: Konica Minolta, Inc., Chiyoda-ku, Tokyo (JP)

(72) Inventor: Haruka Moriyama, Musashino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/768,704

(22) PCT Filed: Oct. 17, 2016

(86) PCT No.: PCT/JP2016/080670
§ 371 (c)(1),
(2) Date: Apr. 16, 2018

(87) PCT Pub. No.: WO2017/069077
PCT Pub. Date: Apr. 27, 2017

(65) Prior Publication Data
US 2018/0311986 A1    Nov. 1, 2018

(30) Foreign Application Priority Data
Oct. 19, 2015    (JP) .............................. 2015-205444

(51) Int. Cl.
| B41M 5/00 | (2006.01) |
| B41J 2/01 | (2006.01) |
| C09D 11/102 | (2014.01) |
| C09D 11/106 | (2014.01) |
| C09D 11/107 | (2014.01) |
| C09D 11/322 | (2014.01) |
| C09D 11/38 | (2014.01) |

(52) U.S. Cl.
CPC .............. *B41M 5/0023* (2013.01); *B41J 2/01* (2013.01); *B41M 5/0017* (2013.01); *B41M 5/0047* (2013.01); *B41M 5/0064* (2013.01); *C09D 11/102* (2013.01); *C09D 11/106* (2013.01); *C09D 11/107* (2013.01); *C09D 11/322* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| 2010/0279081 A1* | 11/2010 | Koele ................... B41J 2/2132 |
| | | 428/195.1 |
| 2014/0085376 A1* | 3/2014 | Kato .................... B41J 2/16552 |
| | | 347/33 |
| 2014/0132661 A1 | 5/2014 | Inumaru et al. |
| 2015/0197654 A1 | 7/2015 | Okuda et al. |

FOREIGN PATENT DOCUMENTS

| EP | 2660066 A1 | 11/2013 | |
| JP | H11268256 A | 10/1999 | |
| JP | 2000079696 A | 3/2000 | |
| JP | 2003326829 A | 11/2003 | |
| JP | 2004107454 A | 4/2004 | |
| JP | 2004306266 A | 11/2004 | |
| JP | 2006096995 A | 4/2006 | |
| JP | 2009166387 A | 7/2009 | |
| JP | 2010201714 A * | 9/2010 | ............... B41J 2/01 |
| JP | 2010201714 A | 9/2010 | |
| JP | 2013082195 A | 5/2013 | |

(Continued)

OTHER PUBLICATIONS

International Search Report corresponding to Application No. PCT/JP2016/080670; dated Dec. 20, 2016.
Written Opinion of the International Searching Authority corresponding to Application No. PCT/JP2016/080670; dated Dec. 20, 2018.

(Continued)

*Primary Examiner* — Manish S Shah
(74) *Attorney, Agent, or Firm* — Cantor Colburn LLP

(57) ABSTRACT

An object of the present invention is to provide an ink jet image forming method capable of obtaining a high grade image quality in which blur is suppressed even in the case of performing printing with respect to a low water-absorption recording medium. The present invention relates to an ink jet image forming method. The ink jet image forming method includes: an image forming step of ejecting and impacting an ink jet recording ink containing at least a pigment, an organic solvent, and water onto a region of low water-absorption recording medium, in which a resin and a pigment aggregating agent are attached to a surface, from a nozzle of an ink jet head, wherein in the image forming step, relative humidity of a space between the nozzle and the recording medium is greater than or equal to 50% and less than or equal to 95%.

19 Claims, No Drawings

(56) References Cited

FOREIGN PATENT DOCUMENTS

JP    2015074692 A    4/2015
JP    2015085576 A    5/2015

OTHER PUBLICATIONS

Extended European Search Report corresponding to Application No. 16857392.1-1019/3366485 PCT/JP2016080670; dated Sep. 20, 2018.

* cited by examiner

INK JET IMAGE FORMING METHOD

CROSS REFERENCE TO RELATED APPLICATIONS

This is the U.S. national stage of application No. PCT/JP2016/080670, filed on Oct. 17, 2016. Priority under 35 U.S.C. § 119(a) and 35 U.S.C. § 365(b) is claimed from Japanese Application No. 2015-205444, filed on Oct. 19, 2015, the disclosure of which is also incorporated herein by reference.

TECHNICAL FIELD

The present invention relates to an ink jet image forming method.

BACKGROUND ART

An ink jet recording method is capable of simply preparing an image at a low price, and thus, can be applied to various printing fields including special printing such as photographs, various printings, marking, and a color filter.

In an ink jet ink used for the ink jet recording method, there are a plurality of types of inks such as an aqueous ink containing water and a small amount of organic solvent, a non-aqueous ink containing an organic solvent but not substantially containing water, a hot-melt ink forming an image by heating and melting a solid ink at a room temperature, and an active light ray curable ink cured by being irradiated with an active light ray after being impacted onto a recording medium, and the ink jet inks are differently used according to the application.

Among them, in general, the aqueous ink is widely used for a household printer or the like from the viewpoint of less odor and high safety. In an ink jet image forming method using the aqueous ink, a water-absorption high recording medium is used, and thus, an excellent image quality is obtained. At this time, a technology is known in which a treatment liquid is applied in advance onto the recording medium, and thus, a quality of an image to be formed increases. For example, in the invention described in Patent Literature 1, an image is formed on regular paper onto which a treatment liquid containing a cation resin, an acid, and a surfactant is applied, by using an aqueous ink containing a coloring agent, a water soluble organic solvent, a surfactant, and a penetrating agent, and thus, a concentration of an image to be formed increases, and abrasion resistance of the image increases.

On the other hand, the aqueous ink has a low viscosity. For this reason, in a case where an image is formed with respect to a recording medium hardly absorbing water of coated paper for gravure or offset printing and a non-water-absorption recording medium such as a film (hereinafter, also simply referred to as a "low water-absorption recording medium") by the aqueous ink, the ink is retained on the recording medium for a long period of time, and thus, blur due to wet spread of an ink droplet easily occurs on the image, or adhesiveness of the image with respect to the recording medium decreases. Regarding such problems, a technology is known in which the treatment liquid is applied in advance onto the recording medium, and thus, blur on the image is suppressed, and the adhesiveness of the image increases. For example, in the invention described in Patent Literature 2, an image is formed on coated paper or a composite resin film onto which a treatment liquid containing polyvinyl alcohol having a saponification degree of less than or equal to 95% is applied, by using an aqueous ink, and thus, color mixture on an image to be formed is suppressed, and abrasion resistance of the image increases.

CITATION LIST

Patent Literature

Patent Literature 1: JP 2009-166387 A
Patent Literature 2: JP 2015-85576 A
Patent Literature 3: JP 11-268256 A
Patent Literature 4: JP 2000-79696 A

SUMMARY OF INVENTION

Technical Problem

However, according to the findings of the present inventors, in the method described in Patent Literature 2, it is not possible to sufficiently suppress blur on the image. In particular, when image formation using an ink jet recording method is performed at a high velocity, in the method described in Patent Literature 2, an ink droplet impacted onto the recording medium is not sufficiently temporarily fixed (pinned), and thus, blur easily occurs on the image. The same applies to a case where the treatment liquid described in Patent Literature 1 is applied onto the low water-absorption recording medium, and thus, an image is formed by aqueous ink.

The present invention has been made in consideration of the problems described above, and an object thereof is to provide an ink jet image forming method capable of obtaining a high grade image quality in which blur is suppressed, even in the case of performing printing with respect to a low water-absorption recording medium.

Solution to Problem

The object of the present invention is attained by the following means.

[1] An ink jet image forming method including: an image forming step of ejecting and impacting an ink jet recording ink containing at least a pigment, an organic solvent, and water onto a region of low water-absorption recording medium, in which a resin and a pigment aggregating agent are attached to a surface, from a nozzle of an ink jet head, wherein in the image forming step, relative humidity of a space between the nozzle and the recording medium is greater than or equal to 50% and less than or equal to 95%.

[2] The method according to [1], wherein in a mass of the organic solvent contained in the ink jet recording ink, a mass ratio of polyhydric alcohols is highest.

[3] The method according to [1] or [2], wherein the mass of the organic solvent contained in the ink jet recording ink is greater than or equal to 10 mass % and less than or equal to 40 mass % of the total mass of the ink jet recording ink.

[4] The method according to any one of [1] to [3], wherein the pigment aggregating agent is an acid or a polyvalent metal salt.

[5] The method according to any one of [1] to [4], wherein in the region in which the resin and the pigment aggregating agent are attached to the surface, an attachment amount of the resin is greater than or equal to 0.3 g/m$^2$ and less than or equal to 11.0 g/m$^2$.

[6] The method according to any one of [1] to [5], wherein in the region in which the resin and the pigment aggregating agent are attached to the surface, the attachment amount of the resin is greater than or equal to 0.3 g/m² and less than or equal to 3.0 g/m².

[7] The method according to any one of [1] to [6], wherein the resin is a cationic resin or a nonionic resin.

[8] The method according to any one of [1] to [7], wherein in the image forming step, a transport velocity of the recording medium is greater than or equal to 30 m/min and less than or equal to 200 m/min at a linear velocity.

[9] The method according to any one of [1] to [8], wherein in the image forming step, an image is formed by a single-path method.

[10] The method according to any one of [1] to [9], wherein the recording medium is a non-water-absorption film.

[11] The method according to [10], wherein the recording medium is a film subjected to antifogging processing.

[12] The method according to any one of [1] to [11], further including: a resin aggregating agent applying step of attaching a treatment liquid containing a resin, a pigment aggregating agent, and water to the recording medium, and of forming a region in which the resin and the pigment aggregating agent are attached to a surface.

[13] The method according to [12], wherein the treatment liquid is attached to the recording medium in a roll coating mode.

[14] The method according to [12] or [13], further including: a drying step of drying the formed region in which the resin and the pigment aggregating agent are attached to the surface, before the image forming step and after the resin aggregating agent applying step.

Advantageous Effects of Invention

According to the present invention, an ink jet image forming method capable of obtaining a high grade image quality in which blur is suppressed, even in the case of performing printing with respect to a low water-absorption recording medium, is provided. Furthermore, according to the ink jet image forming method of the present invention, it is also possible to suppress the occurrence of a crack in a drying process after an ink is impacted, by further adjusting the conditions.

DESCRIPTION OF EMBODIMENTS

Hereinafter, the present invention will be described by using embodiments, but the present invention is not limited to the following embodiments.

The present invention is an ink jet image forming method including a step of ejecting and impacting an ink jet recording ink containing at least a pigment, an organic solvent, and water into a region of a low water-absorption recording medium, in which a resin and a pigment aggregating agent are attached to a surface, from a nozzle of an ink jet head (hereinafter, also simply referred to as an "image forming step"). In the image forming step, relative humidity of a space between the nozzle and the recording medium is greater than or equal to 50% and less than or equal to 95%. The present invention may further include a step of forming the region in which the resin and the pigment aggregating agent are attached to the surface (hereinafter, also simply referred to as a "resin aggregating agent applying step"), and may further include a step of drying the region in which the resin and the pigment aggregating agent are attached to the surface (hereinafter, also simply referred to as a "drying step").

As a result of intensive studies of the present inventors in order to solve the object, it has been found that an image is formed on a recording medium precoated with a treatment liquid containing at least a resin and a pigment aggregating agent, by using an aqueous ink jet recording ink, and thus, a high grade image quality in which blur is suppressed, is obtained. In particular, according to the findings of the present inventors, in the method of the present invention, blur hardly occurs even in the case of performing printing at a high velocity.

In the image forming step, the resin and the pigment aggregating agent are attached to a region of at least a part of the surface of the recording medium. In the present invention, it is considered that the aqueous ink jet recording ink is impacted onto the region on the recording medium, to which the resin and the pigment aggregating agent are attached, and thus, the pigment aggregating agent is separated from the resin, and is dissolved and diffused in the impacted recording ink, and the pigment is aggregated and fixed, and thus, blur is suppressed.

In order to suppress blur, it is preferable to increase a dissolving diffusion velocity with respect to the ink jet recording ink of the pigment aggregating agent. In order to increase the dissolving diffusion velocity of the pigment aggregating agent, it is preferable that the resin further swells or is dissolved than the impacted recording ink. In the present invention, it is considered that the relative humidity of the space between the nozzle of the ink jet head and the recording medium at the time of impacting the ink jet recording ink onto the recording medium is greater than or equal to 50% and less than or equal to 95%, and thus, the resin easily swells or is easily dissolved in the recording ink, and the dissolving diffusion velocity of the pigment aggregating agent increases, and thus, blur on the image can be further suppressed.

1. Image Forming Step

The present invention includes the step of ejecting and impacting the ink jet recording ink containing at least the pigment, the organic solvent, and water onto the region of the low water-absorption recording medium, in which the resin and the pigment aggregating agent are attached to the surface, from the nozzle of the ink jet head.

1-1. Humidity

In this step, the relative humidity of the space between the nozzle and the recording medium is adjusted to be greater than or equal to 50% and less than or equal to 95%. According to the findings of the present inventors, in a case where the relative humidity is less than 50%, the resin may not easily sufficiently swell or may not be easily sufficiently dissolved in the recording ink, and thus, blur easily occurs on the image. In addition, in a case where the relative humidity is greater than or equal to 95%, dew condensation occurs in a recording device. The relative humidity of the space between the nozzle and the recording medium from the viewpoint of further preventing blur on the image and of suppressing humidifying cost is preferably adjusted to be greater than or equal to 60% and less than or equal to 90%, and is more preferably adjusted to be greater than or equal to 65% and less than or equal to 85%.

The relative humidity can be adjusted by a known method. For example, as described in Patent Literature 3 and Patent Literature 4, a humidifying unit including a supply port of humidified air is provided in the vicinity of the ink jet head, and thus, the relative humidity of the space between the nozzle and the recording medium can be adjusted to be greater than or equal to 50% and less than or equal to 95%. At this time, an exhaust port may be provided in the recording device, and thus, the humidified air may be exhausted. The humidity can be adjusted to be in the range described above by suitably adjusting any one or both of the amount of humidified air supplied from the supply port and the amount of humidified air discharged from the exhaust port.

It is preferable that the supply port is provided on a carriage for scanning the ink jet head, from the viewpoint of efficiently adjusting the relative humidity of the space between the nozzle and the recording medium.

At this time, for example, relative humidity at an arbitrary point on a straight line connecting the nozzle and the recording medium together is measured by a humidity sensor, and in a case where the relative humidity is greater than or equal to 50% and less than or equal to 95%, the relative humidity of the space between the nozzle and the recording medium can be in the range described above. In addition, as described in Patent Literature 3, when the humidity sensor has a feedback function, and the measured relative humidity is less than 50% or greater than 95%, the relative humidity can be adjusted to be greater than or equal to 50% and less than or equal to 95% by controlling the humidifying unit. In addition, as described in Patent Literature 4, a space including the ink jet head may be covered with a cover, the humidifying unit, the humidity sensor, and the exhaust port may be arbitrarily provided in the space, the measured humidity may be fed back by the humidity sensor, and the humidity of the space covered with the cover may be adjusted to be in the range described above, and thus, an image may be formed while allowing the recording medium to pass through the space.

1-2. Low Water-Absorption Recording Medium

Examples of the low water-absorption recording medium include a recording medium having low water absorption, such as coated paper for gravure or offset printing, which is difficult to obtain image formation using ink jet and adhesiveness, and a non-water-absorption recording medium such as a film, a plastic board, glass, a tile, and rubber. Examples of the plastic board include soft vinyl chloride, hard vinyl chloride, an acrylic plate, and a polyolefin-based plastic board.

Examples of the non-water-absorption film include a known plastic film. Specific examples of the known plastic film include a biodegradable film such as a polyester film including polyethylene terephthalate or the like, a polyethylene film, a polypropylene film, a polyamide-based film, a polystyrene film including nylon or the like, a polyvinyl chloride film, a polycarbonate film, a polyacrylonitrile film, and a polylactic acid film, and the like. In addition, in order to apply gas barrier properties, moistureproofness, aroma preserving properties, and the like, a film of which one surface or both surfaces are coated with polyvinylidene chloride, or a film on which a metal oxide is subjected to vapor deposition can also be preferably used.

The non-water-absorption film may be an unstretched film or a stretched film.

In addition, in general, in a case where the recording is performed with respect to the non-water-absorption film subjected to the antifogging processing, in which it is difficult to obtain the adhesiveness of the recording ink, by the method of the present invention, the adhesiveness of the image further increases. In general, a film containing a surfactant is used as the film subjected to the antifogging processing, but it is known that the surfactant has a baleful influence on the adhesiveness of the recording ink. In a case where the recording is performed with respect to such a film by the method of the present invention, the surfactant is hardly aligned to a high concentration on an interface with respect to the recording ink layer, and thus, the present inventors have assumed that the surfactant does not inhibit the adhesion between the ink and the recording medium.

It is preferable that the surface of the non-water-absorption film is subjected to a surface treatment by corona discharge, an ozone treatment, or the like.

1-3. Region in which Resin and Pigment Aggregating Agent are Attached to Surface In this step, the ink jet recording ink is impacted onto the region of the recording medium, in which the resin and the pigment aggregating agent are attached to the surface. The region may be formed on at least a part of the recording medium, or may be formed on the entire surface of the recording medium.

1-3-1. Resin

The type of resin is not particularly limited insofar as it is possible to maintain and disperse the pigment aggregating agent described below. When the pigment aggregating agent described below is a polyvalent metal salt or an acid, it is preferable that the resin is a cationic resin or a nonionic resin from the viewpoint of increasing compatibility with respect to the pigment aggregating agent. Examples of such a resin include a urethane-based resin, an acrylic resin, an olefin-based resin, a polyvinyl alcohol, and the like. The resin may be a hybrid resin. Examples of the hybrid resin include a urethane-acryl hybrid resin or the like, having a hydrophobic portion and a hydrophilic portion, and a core-shell type structure. Only one type of the resin may be used, or two or more types thereof may be used.

The resin swells or is dissolved, and then, thickens and forms again a film, and thus, more rigidly fixes the pigment which is aggregated by the pigment aggregating agent described below to the recording medium. For this reason, according to the present invention, even in a case where the ink droplet contracts by being dried, the pigment is hardly moved, and a crack hardly occurs on the image.

It is preferable that the resin is resin fine particles. It is preferable that an average particle diameter of the resin fine particles is in a range of greater than or equal to 10 nm and less than or equal to 500 nm. The average particle diameter can be measured by a commercially available particle diameter measurement device using a dynamic light scattering method, an electrophoretic method, and the like, and the measurement using the dynamic light scattering method is simple, and is capable of accurately measuring a particle diameter region.

Examples of a commercially available product containing the urethane-based resin include "UREARNO W600", "UREARNO KL-422", and "UREARNO W321", manufactured by Arakawa Chemical Industries, Ltd. ("UREARNO" is a registered trademark of Arakawa Chemical Industries, Ltd.), "SUPERFLEX 210", "SUPERFLEX 620", and "SUPERFLEX F2421D", manufactured by DKS Co. Ltd. ("SUPERFLEX" is a registered trademark of DKS Co. Ltd.), "PASCOL AD-1", "PASCOL V-440", "PASCOL JK-870", and "PASCOL E-717", manufactured by Meisei Chemical Works, Ltd. ("PASCOL" is a registered trademark of Meisei Chemical Works, Ltd), "HUX-401", "HUX-2520", "HUC-564", and "HUX-680", manufactured by ADEKA CORPORATION, "PERMARIN UC-20", manufactured by Sanyo Chemical Industries, Ltd. ("PERMARIN" is a registered trademark of Sanyo Chemical Industries, Ltd.), "PARASOL PC-238", "PARASOL PC-86", and "PARASURF UP-22", manufactured by Ohara Paragium Chemical Co., Ltd. ("PARASOL" is a registered trademark of Ohara Paragium Chemical Co., Ltd.), and the like.

Examples of a commercially available product containing the acrylic resin include "RKW-620" and "AKW-107", manufactured by TAISEI FINE CHEMICAL CO., LTD., and the like.

Examples of a commercially available product containing the olefin-based resin include "Arobase CB-1200" and "Arobase DC-1200", manufactured by Unitika Ltd. ("Arobase" is a registered trademark of Unitika Ltd.), "E-415", "E-480T", "AE-301", "AE-202", and "AE-502", manufactured by Nippon Paper Industries Co., Ltd., and the like.

Examples of a commercially available product containing the urethane-acryl hybrid resin include "ACRIT WEM-505c" and "ACRIT WEM-506c", manufactured by TAISEI FINE CHEMICAL CO., LTD. ("ACRIT" is a registered trademark of TAISEI FINE CHEMICAL CO., LTD.), "PARACON PJ-52", manufactured by Ohara Paragium Chemical Co., Ltd., "T-GN133", "SE2202", and "WS4030", manufactured by SEIKO PMC CORPORATION, "Polymaron 360", manufactured by Arakawa Chemical Industries, Ltd. ("Polymaron" is a registered trademark of Arakawa Chemical Industries, Ltd.), and the like.

Examples of other resins include polyethylene imine, polyallyl amine, or the like, which is a cation resin.

An attachment amount of the resin with respect to the recording medium is preferably greater than or equal to 0.3 g/m$^2$, and is more preferably greater than or equal to 0.8 g/m$^2$, from the viewpoint of preventing a crack from occurring on the image, which occurs when an ink solvent is dried after the aggregated pigment is more rigidly fixed to the recording medium by the resin, and the ink is impacted. The upper limit of the attachment amount is not particularly limited, but in a case where the recording medium to which the resin is attached, is stored by being wound into the shape of a roll, it is preferable that the upper limit of the attachment amount is less than or equal to 11.0 g/m$^2$ from the viewpoint of easily performing the winding. In addition, it is preferable that is less than or equal to 3.0 g/m$^2$ from the viewpoint of retaining a texture of a thin film for soft packaging application and from the viewpoint of further reducing a load or a cost necessary for drying the recording medium.

1-3-2. Pigment Aggregating Agent

The pigment aggregating agent is not particularly limited insofar as the pigment contained in the ink jet recording ink can be aggregated. Examples of such a pigment aggregating agent include a polyvalent metal salt, an acid, and the like. Only one type of the pigment aggregating agent may be used, or two or more types thereof may be used.

Examples of the polyvalent metal salt include calcium chloride, magnesium nitrate, and aluminum chloride. Examples of the acid include a malonic acid, a malic acid, a citric acid, a phosphoric acid, and a succinic acid.

Among them, the acid is preferable, and the polyvalent organic acid is more preferable, from the viewpoint of preventing blocking from occurring on the recording medium. Preferred examples of the polyvalent organic acid include a malonic acid and a malic acid.

1-4. Ink Jet Recording Ink

The ink jet recording ink contains a pigment, an organic solvent, and water.

1-4-1. Pigment

The type of pigment is not particularly limited insofar as the effects of the present invention can be obtained, and for example, a self-dispersible pigment in which a pigment surface is treated with an ionic compound, and a pigment in which the pigment is dispersed by the polymer dispersion agent, can be used. Among them, a pigment in which pigment is dispersed by an anionic self-dispersible pigment and an anionic polymer dispersion agent is preferable, and a pigment in which the pigment is dispersed by an anionic polymer dispersion agent is more preferable. Only one type of the pigment may be used, or two or more types thereof may be used.

Examples of the pigment include an organic pigment including an insoluble pigment and a lake pigment, and the like.

Examples of the insoluble pigment include a pigment having a structure such as azo, azomethine, methine, diphenyl methane, triphenyl methane, quinacridone, anthraquinone, perylene, indigo, quinophthalone, isoindolinone, isoindoline, azine, oxazine, thiazine, dioxazine, thiazole, phthalocyanine, and diketopyrrolopyrrole.

Specific examples of a pigment which can be preferably used include the following pigments.

Examples of a pigment for magenta or red include C.I. pigment red 2, C.I. pigment red 3, C.I. pigment red 5, C.I. pigment red 6, C.I. pigment red 7, C.I. pigment red 15, C.I. pigment red 16, C.I. pigment red 48:1, C.I. pigment red 53:1, C.I. pigment red 57:1, C.I. pigment red 122, C.I. pigment red 123, C.I. pigment red 139, C.I. pigment red 144, C.I. pigment red 149, C.I. pigment red 166, C.I. pigment red 177, C.I. pigment red 178, C.I. pigment red 202, C.I. pigment red 222, C.I. pigment violet 19, and the like.

Examples of a pigment for orange or yellow include C.I. pigment orange 31, C.I. pigment orange 43, C.I. pigment yellow 12, C.I. pigment yellow 13, C.I. pigment yellow 14, C.I. pigment yellow 15, C.I. pigment yellow 15:3, C.I. pigment yellow 17, C.I. pigment yellow 74, C.I. pigment yellow 93, C.I. pigment yellow 128, C.I. pigment yellow 94, C.I. pigment yellow 138, C.I. pigment yellow 155, and the like. Among them, C.I. pigment yellow 155 is preferable from the viewpoint of a balance between a color hue and light resistance.

Examples of a pigment for green or cyan include C.I. pigment blue 15, C.I. pigment blue 15:2, C.I. pigment blue 15:3, C.I. pigment blue 16, C.I. pigment blue 60, C.I. pigment green 7, and the like.

In addition, examples of a pigment for black include C.I. pigment black 1, C.I. pigment black 6, C.I. pigment black 7, and the like.

The polymer dispersion agent used at the time of dispersing the pigment is not particularly limited insofar as the pigment can be dispersed in the ink jet recording ink. It is preferable that a molecular weight of the polymer dispersion agent is greater than or equal to 5000 and less than or equal to 200000.

Examples of the polymer dispersion agent include a block copolymer, a random copolymer, and salts thereof, polyoxyalkylene, polyoxyalkylene alkyl ether, and the like, having a structure derived from two or more types of monomers styrene, a styrene derivative, a vinyl naphthalene derivative, an acrylic acid, an acrylic acid derivative, a maleic acid, a maleic acid derivative, an itaconic acid, an itaconic acid derivative, a fumaric acid, and a fumaric acid derivative. Only one type of the polymer dispersion agent may be used, or two or more types thereof may be used.

The content of the polymer dispersion agent is preferably in a range of 10 mass % to 100 mass %, is more preferably in a range of 10 mass % to 40 mass %, with respect to the pigment.

It is particularly preferable that the pigment is in the shape of a so-called capsule pigment in which the pigment is covered with the polymer dispersion agent. A method of covering the pigment with the polymer dispersion agent can be various known methods. Examples of the method of covering the pigment with the polymer dispersion agent include a phase inversion emulsification method, an acid precipitation method, a method in which the pigment is dispersed by a polymerizable surfactant, a monomer is supplied to the dispersed pigment, and the pigment is covered while being polymerized, and the like.

Particularly preferred examples of the method of covering the pigment with the polymer dispersion agent include a method in which a water insoluble resin is dissolved in an organic solvent such as methyl ethyl ketone, an acidic group of the resin is partially or completely neutralized in a base, and then, a pigment and ion exchange water are added and dispersed, and then, the organic solvent is removed, and water is added as necessary, and thus, the pigment covered with the polymer dispersion agent is prepared.

It is preferable that an average particle diameter in a dispersion state of a combination of the self-dispersible pigment or the pigment, and the dispersion resin in the ink jet recording ink is greater than or equal to 50 nm and less than 200 nm. In a case where the average particle diameter is in the range described above, dispersion stability of the pigment can be improved, and preservation stability of the recording ink can be improved. The particle diameter of the pigment can be measured by a commercially available particle diameter measurement device using a dynamic light scattering method, an electrophoretic method, and the like, and the measurement using the dynamic light scattering method is simple, and is capable of accurately measuring a particle diameter region.

The pigment can be used by being dispersed by a dispersion machine, along with a dispersion agent and other additives which are necessary according to desired objects.

A known ball mill, a sand mill, a line mill, a high-pressure homogenizer, and the like of the related art can be used as the dispersion machine. Among them, in a case where the combination of the pigment or the pigment and the dispersion resin is dispersed by the sand mill, it is possible to further narrow the range of the particle size distribution. A material of a bead used for sand mill dispersion is not particularly limited, but zirconia or zircon is preferable from the viewpoint of preventing the occurrence of a bead fraction or the contamination of an ion component. It is preferable that a bead diameter is 0.3 mm to 3 mm.

The content of the pigment in the recording ink is not particularly limited, but is preferably in a range of 7 mass % to 18 mass % with respect to titanium oxide, and is preferably in a range of 0.5 mass % to 7 mass % with respect to the organic pigment.

1-4-2. Organic Solvent

The type of organic solvent is not particularly limited insofar as the effects of the present invention can be obtained. It is preferable that the organic solvent is water-soluble from the viewpoint of increasing the compatibility with respect to water. Examples of the water-soluble organic solvent include alcohols, polyhydric alcohols, amines, amides, glycol ethers, 1,2-alkanediols having carbon atoms of greater than or equal to 4, and the like. Only one type of the organic solvent may be used, or two or more types thereof may be used.

Examples of alcohols described above include methanol, ethanol, propanol, isopropanol, butanol, isobutanol, secondary butanol, tertiary butanol, and the like.

Examples of polyhydric alcohols described above include ethylene glycol, diethylene glycol, triethylene glycol, tetraethylene glycol, polyethylene glycol having the number of ethylene oxide groups of greater than or equal to 5, propylene glycol, dipropylene glycol, tripropylene glycol, polypropylene glycol having the number of propylene oxide groups of greater than or equal to 4, butylene glycol, hexanediol, pentanediol, glycerin, hexanetriol, thiodiglycol, and the like.

Examples of amines described above include ethanol amine, diethanol amine, triethanol amine, N-methyl diethanol amine, N-ethyl diethanol amine, morpholine, N-ethyl morpholine, ethylene diamine, diethylene diamine, triethylene tetramine, tetraethylene pentamine, polyethylene imine, pentamethyl diethylene triamine, tetramethyl propylene diamine, and the like.

Examples of amides described above include formamide, N,N-dimethyl formamide, N,N-dimethyl acetamide, and the like.

Examples of glycol ethers described above include ethylene glycol monoethyl ether, ethylene glycol monobutyl ether, diethylene glycol monoethyl ether, diethylene glycol monobutyl ether, triethylene glycol monobutyl ether, propylene glycol monopropyl ether, dipropylene glycol monomethyl ether, tripropylene glycol monomethyl ether, and the like.

Examples of 1,2-alkanediols having carbon atoms of greater than or equal to 4, described above, include 1,2-butanediol, 1,2-pentanediol, 1,2-hexanediol, 1,2-heptanediol, and the like.

Among them, in a case where the organic solvent is polyhydric alcohols, blur at the time of performing printing at a high velocity can be preferably suppressed. Preferred examples of polyhydric alcohols include ethylene glycol, diethylene glycol, triethylene glycol, tetraethylene glycol, propylene glycol, dipropylene glycol, tripropylene glycol, and the like.

When the ink jet recording ink contains two or more types of organic solvents, a mass ratio of polyhydric alcohols described above with respect to the total mass of the organic solvent is higher than a mass ratio of the other organic solvents, and thus, it is possible to prevent the occurrence of a crack on the formed image. It is considered that this is because the composition of the organic solvent is set as described above, and thus, the resin applied to the recording medium suitably swells or is suitably dissolved, and easily thickens and forms again a film. It is preferable that the mass ratio of polyhydric alcohols with respect to the total mass of the organic solvent is greater than or equal to 50%. Furthermore, when two or more types of polyhydric alcohols are contained, the total mass ratio of all polyhydric alcohols may be higher than a mass ratio of the other types of organic solvents, and for example, the mass ratio of polyhydric alcohols with respect to the total mass of the organic solvent may be greater than or equal to 50%.

The content of the organic solvent in the recording ink, for example, can be in a range of greater than or equal to 5 mass % and less than or equal to 60 mass %.

According to the findings of the present inventors, the content of the organic solvent in the recording ink is set to be in the rage of greater than or equal to 10 mass % and less than or equal to 40 mass %, and thus, it is possible to further prevent the occurrence of a crack on the image. When the image is formed by using the aqueous ink, water, which is the solvent, is evaporated from the ink droplet impacted onto the recording medium, and thus, the ink droplet may contract, and a crack may occur on the image. In contrast, the content of the organic solvent is set to be in the range described above, and thus, the resin suitably swells or is suitably dissolved by polyhydric alcohols. The swelled and dissolved resin thickens, and thus, forms again a film in the formed image. According to the film of the resin formed as described above, it is considered that the ink droplet hardly contracts at the time of drying the formed image, and a crack hardly occurs on the image.

1-4-3. Other Components

The ink jet recording ink may contain resin fine particles, a surfactant, and other components.

Examples of the resin fine particles include resin fine particles having a polyurethane structure, resin fine particles having a polyolefin structure such as polypropylene, resin fine particles having a styrene acryl structure, and the like.

It is preferable that the content of the resin fine particles is less than 2 mass % with respect to the total mass of the ink jet recording ink. The concentration of the resin fine particles is set to be in the range described above, and thus, it is possible to ensure stable exiting performance in continuous exiting or intermittent exiting of the recording ink.

It is preferable that an average particle diameter of the resin fine particles is in a range of 10 nm to 200 nm. The average particle diameter can be simply measured by using a commercially available measure device using a light scattering method or a laser doppler method. In addition, a dispersed material of the resin fine particles is frozen and dried, and thus, the average particle diameter can be converted from particles observed by a transmissive type microscope.

In order to improve ink exiting stability, or to control expansion (a dot diameter) of the droplet impacted onto the recording medium, the surfactant can be contained in the ink jet recording ink.

At this time, a surface tension of the recording ink is preferably adjusted to be less than or equal to 35 mN/m, and is more preferably adjusted to be less than or equal to 30 mN/m.

The type of surfactant is not particularly limited. It is preferable that ionic properties of the surfactant are an anion type, a nonion type, or a betaine type, from the viewpoint that the ink jet recording ink contains an anionic compound as the pigment, the pigment dispersion element, or the like.

Preferred examples of the surfactant include a fluorine-based or silicon-based surfactant having a high lowering ability of a static surface tension, an anion surfactant such as dioctyl sulfosuccinate having a high lowering ability of a dynamic surface tension, polyoxyethylene alkyl ether, polyoxyethylene alkyl phenyl ether, and acetylene glycols, having a comparatively low molecular weight, a pluronic type surfactant, and a nonion surfactant such as a sorbitan derivative. Among them, it is preferable that the fluorine-based or silicon-based surfactant having a high lowering ability of a static surface tension, and a high surfactant having a high lowering ability of a dynamic surface tension are used together.

It is preferable that the content of the surfactant in the ink jet recording ink is in a range of 0.1 mass % to 5.0 mass %.

In the ink jet recording ink, various known additives, for example, polysaccharides, a viscosity adjuster, a specific resistance adjuster, a film forming agent, an ultraviolet ray absorbent, an antioxidant, an antifading agent, an antimold agent, an antirust agent, and the like can be suitably selected and used in addition to the components described above, as necessary, according to the object of improving all performances such as exiting stability, print head or ink cartridge adequateness, preservation stability, image preservability, and the like, and examples of the known additives are capable of including oil droplet fine particles such as liquid paraffin, dioctyl phthalate, tricresyl phosphate, and silicon oil, an ultraviolet ray absorbent described in JP 57-74193 A, JP 57-87988 A, and JP 62-261476 A, an antifading agent described in JP 57-74192 A, JP 57-87989 A, JP 60-72785 A, JP 61-146591 A, JP 1-95091 A, JP 3-13376 A, and the like, a fluorescent brightener described in JP 59-42993 A, JP 59-52689 A, JP 62-280069 A, JP 61-242871 A, JP 4-219266 A, and the like, and the like.

A viscosity of the ink jet recording ink is preferably 1 mPa·s to 40 mPa·s, and is more preferably 2 mPa·s to 10 mPa·s, at 25° C.

1-5. Ejection and Impact of Ink Jet Recording Ink

The ink jet recording ink is ejected from the nozzle of the ink jet head, and is impacted onto the region of the recording medium, in which the resin and the pigment aggregating agent are attached to the surface.

The ink jet head which can be used in the present invention may be in an on-demand type or a continuous type. In addition, the ink jet head which can be used in the present invention may be a line head type in which an ink is ejected by a single-path method, or may be a serial head type in which an ink is ejected by a scan method. In addition, any ejection method such as an electromechanical conversion method (for example, a single cavity type, a double cavity type, a bender type, a piston type, a share mode type, a shared wall type, and the like), and an electrothermal conversion method (for example, a thermal ink jet type, a Bubble Jet ("Bubble Jet" is a registered trademark of Canon Inc.) type, and the like) may be used as an ejection method.

A transport velocity of the recording medium, for example, can be set to be in a range of greater than or equal to 1 m/min and less than or equal to 200 m/min. An image forming velocity increases as the transport velocity increases. In the present invention, in the case of using a single-path type ink jet image forming method, it is possible to prevent the occurrence of blur even at an extremely high linear velocity of a linear velocity of greater than or equal to 30 m/min and less than or equal to 200 m/min.

The single-path type ink jet image forming method applies the ink droplet to all pixels in which a dot is formed by one pass of the recording medium when the recording medium passes through a lower portion of one ink jet head unit.

A line head type ink jet head indicates an ink jet head having a length of greater than or equal to a width of an image forming range. An ink jet head including one head which is greater than or equal to the width of the image forming range may be used as the line head type ink jet head, or the line head type ink jet head may be configured such that a plurality of heads are combined to be greater than or equal to the width of the image forming range. In addition, at this time, the plurality of heads may be juxtaposed such that the nozzles are zigzag-aligned to each other. In a case where the plurality of heads are juxtaposed such that the nozzles are zigzag-aligned to each other, it is possible to increase definition of the entire heads.

2. Resin-Aggregating Agent Applying Step

The present invention may further include a step of forming a region in which a resin and a pigment aggregating agent are attached to a surface. The region, for example, can be formed by attaching a treatment liquid containing the resin, the pigment aggregating agent, and water to the recording medium.

The resin and the pigment aggregating agent contained in the treatment liquid may be the resin and the pigment aggregating agent which are attached to the surface of the recording medium.

It is preferable that the pigment aggregating agent is an acid from the viewpoint of increasing preservation stability of the treatment liquid.

When the pigment aggregating agent is a polyvalent metal salt, it is preferable that the content of the polyvalent metal salt with respect to the total mass of the treatment liquid is greater than or equal to 0.03 mass % and less than or equal to 1 mass %. When the pigment aggregating agent is an acid, it is preferable that the amount of acid in the treatment liquid is an amount in which pH of the treatment liquid can be adjusted to be less than or equal to a neutralization equivalent of the anion component contained in the ink jet recording ink.

The treatment liquid may further contain an organic solvent. When the treatment liquid contains an organic solvent, the content of the organic solvent with respect to the total mass of the treatment liquid is preferably less than 30 mass %, is more preferably less than 25 mass %, and is most preferably less than 20 mass %.

The treatment liquid may further contain a surfactant. When the treatment liquid contains a surfactant, it is preferable that the content of the surfactant with respect to the total mass of the treatment liquid is greater than or equal to 0.1 mass % and less than or equal to 3.0 mass %.

The type of organic solvent and the type of surfactant are not particularly limited, but it is preferable that the organic solvent and the surfactant are a compound which is identical to the organic solvent or the surfactant contained in the ink jet recording ink.

The treatment liquid can be attached to the recording portion by bar coating, spray coating, curtain coating, roll coating, screen printing, offset printing, gravure printing, a method using a plate, such as a convex plate and a concave plate, a method not using a plate, such as ink jet, and the like. Among them, it is preferable to attach the treatment liquid by the screen printing, the offset printing, the gravure printing, the bar coat, or the roll coating, and it is more preferable to attach the treatment liquid by the roll coating method, from the viewpoint of easily performing an operation and of enabling the treatment liquid to be evenly attached.

In the amount of treatment liquid to be attached, the attachment amount of the resin with respect to the recording medium is more preferably greater than or equal to 0.3 g/m$^2$, and is even more preferably greater than or equal to 0.8 g/m$^2$.

3. Drying Step

The present invention may further include a step of drying the region in which the resin and the pigment aggregating agent are attached to the surface, after the resin aggregating agent applying step and before the image forming step. The drying step, for example, can be performed by heating of a heater, blowing of hot air, irradiation of an infrared ray, suction of moisture, or the like.

EXAMPLES

Hereinafter, the present invention will be described in detail by using examples, but the present invention is not limited thereto.

1. Preparation of Treatment Liquid

The treatment liquid was prepared by using the following materials.

[Resin]

Resin 1: Urethane-Based Resin Fine Particles ("SUPERFLEX 650" manufactured by DKS Co. Ltd.)

Resin 2: Urethane-Based Resin Fine Particles ("SUPERFLEX 620" manufactured by DKS Co. Ltd.)

Resin 3: Acrylic Resin Fine Particles ("ACRIT RKW-620" manufactured by TAISEI FINE CHEMICAL CO., LTD.)

Resin 4: Urethane-Acryl Hybrid Resin Fine Particles Having Core-Shell Type Structure ("ACRIT WEM-505c" manufactured by TAISEI FINE CHEMICAL CO., LTD.)

Resin 5: Polyvinyl Alcohol ("PVA240" manufactured by KURARAY CO., LTD.)

Resin 6: Olefin-Based Resin Fine Particles ("AE-202" manufactured by Nippon Paper Industries Co., Ltd.)

[Pigment Aggregating Agent]

Malonic Acid

Chloride Calcium

The respective materials were stirred while being sequentially added such that the compositions of the resin, the pigment aggregating agent, and water had the ratios shown in Table 1 ratio (the unit is mass %), and then, were filtered by a filter of 5.0 μm, and thus, treatment liquids Nos. 1 to 8, and 10 were obtained. Furthermore, there was no substantial composition change before and after the filtration. In addition, the respective materials were stirred while being sequentially added such that the compositions of the pigment aggregating agent and water had the ratios shown in Table 1 (the unit is mass %), and thus, a treatment liquid No. 9 was obtained.

TABLE 1

Compositions of Treatment Liquids Nos. 1 to 8

| | | Treatment Liquid No. | | | | | | | | | |
|---|---|---|---|---|---|---|---|---|---|---|---|
| | | 1 | 2 | 3 | 4 | 5 | 6 | 7 | 8 | 9 | 10 |
| Resin | Resin 1 | 20 | 10 | | | | | | 20 | | 20 |
| | Resin 2 | | | 20 | | | | | | | |
| | Resin 3 | | | | 20 | | | | | | |
| | Resin 4 | | | | | 20 | | | | | |
| | Resin 5 | | | | | | 5 | | | | |
| | Resin 6 | | | | | | | 20 | | | |
| Pigment Aggregating Agent | Malonic Acid | 4 | 2 | 4 | 4 | 4 | 1 | 4 | | 4 | |
| | Calcium Chloride | | | | | | | | | | 2 |
| Water | | 76 | 88 | 76 | 76 | 76 | 94 | 76 | 80 | 96 | 78 |

2. Preparation of Recording Ink

[Preparation of Pigment Dispersion Liquid]

A mixed liquid in which 5.4 parts by mass of "Joncryl 819", manufactured by BASF SE (an acid value of 75, "Joncryl" is a registered trademark of BASF SE) as the polymer dispersion agent, 18 parts by mass of pigment blue 15:3 ("FastogenBlue FGF" manufactured by DIC Corporation, "Fastogen" is a registered trademark of DIC Corporation) as the pigment, and 76.6 parts by mass of ion exchange water as the residue were added, was premixed, and then, was dispersed by using a sand grinder filled with zirconia beads of 0.5 mm at a volume fraction of 50%, and thus, a pigment dispersion liquid of which the content of the pigment was 20 mass %, was prepared.

[Preparation of Recording Ink]

While stirring 22.0 parts by mass of the prepared pigment dispersion liquid, the respective materials were stirred while being sequentially added such that the compositions of the pigment dispersion liquid, the organic solvent, and water had the ratios shown in Table 2 (the unit is mass %), were filtered by a filter 0.8 μm, and thus, recording inks Nos. 1 to 7 were obtained.

[Organic Solvent]

EG: Ethylene Glycol

DEGmBE: Diethylene Glycol Monobutyl Ether

[Surfactant]

MF444: Nonion-Based Surfactant ("Megafac F-444" manufactured by DIC Corporation)

Furthermore, in Table 2, the section of "Polyhydric Alcohol Concentration" indicates a mass ratio of polyhydric alcohols in the mass of the organic solvent contained in each of the inks. In addition, the section of "Ratio of Organic Solvent" indicates a mass ratio of the organic solvent with respect to the total mass of the ink.

TABLE 2

Compositions of Inks Nos. 1 to 7

|  | Ink No. | | | | | | |
|---|---|---|---|---|---|---|---|
|  | 1 | 2 | 3 | 4 | 5 | 6 | 7 |
| Pigment Dispersion Liquid | 22 | 22 | 22 | 22 | 22 | 22 | 22 |
| Organic Solvent EG | 15 | 30 | 8 | 32 | 6 | 5 | 10 |
| Organic Solvent DEGmBE | 10 | 8 | 3 | 10 | 2 | 10 | 20 |
| Surfactant MF444 | 0.5 | 0.5 | 0.5 | 0.5 | 0.5 | 0.5 | 0.5 |
| Ion Exchange Water | 52.5 | 39.5 | 66.5 | 35.5 | 69.5 | 62.5 | 47.5 |
| Concentration of Polyhydric Alcohol | 60% | 79% | 73% | 76% | 75% | 33% | 33% |
| Ratio of Organic Solvent | 25% | 38% | 11% | 42% | 8% | 15% | 30% |

[Recording and Evaluation]

(Preparation of Photographic Sample)

A biaxially stretched polypropylene film (OPP) ("FOS", manufactured by FUTAMURA CHEMICAL CO., LTD., a film thickness of 60 μm, a one surface corona treatment) was prepared as the recording medium. The attachment amount of the resin and the pigment aggregating agent with respect to the surface of the recording medium to which a corona treatment was performed was adjusted to be the amounts shown in Table 3 to Table 6, and the treatment liquids 1 to 10 were applied by a roller coating method, and were dried by hot air at 70° C. for 5 minutes.

Next, a character of 5 points and 7 points was printed on the recording medium to which the treatment liquid was applied, in one scan, by a stage movement type ink jet printer on which a drop-on-demand piezo type ink jet head (the number of nozzles of 1024 (512 μm×2 columns) and a nozzle interval of 70.5 μm (141 μm×2 columns)) was mounted, at the transport velocity of the recording medium described in Table 3 to Table 6, in a condition of an ink droplet volume of 32 pl and a recording density of 360 dpi×360 dpi. Similarly, a void character of 5 points and 7 points, which was formed by not ejecting the ink in the solid image, was printed. Similarly, a solid image was printed in one scan, in a condition of a recording density of 360 dpi×360 dpi. Herein, dpi indicates the number of dots per 2.54 cm. Furthermore, the ink droplet volume was controlled by adjusting an injection voltage for each recording ink. In addition, the environment at the time of performing the ink jet printing was a room temperature of 25° C., and thus, the temperature of the recording medium was also set to 25° C.

Relative humidity was adjusted by a configuration described in FIG. 1 of JP 2007-191701 A. Specifically, humidified air was supplied from an upstream side in a transport direction of the recording medium with respect to the ink jet head such that the humidified air passed through a space between the nozzle of the ink jet head and the recording medium. A partition was provided on a downstream side in the transport direction of the recording medium with respect to the ink jet head such that a flow path of the humidified air was blocked, and a humidity sensor was provided on a position on the partition, which is an intersection point between the flow path of the humidified air and the partition. A discharge port was provided on a lower side of the partition from the humidity sensor, and the humidified air was discharged. A digital thermo-hygrometer ("TH-321(1-5816-01) manufactured by AS ONE Corporation" was used as the humidity sensor, the measured value was set to relative humidity of the space between the nozzle of the ink jet head and the recording medium. The measured relative humidity was fed back to the humidifying unit, a supply amount of the humidified air from the humidifying unit was changed, and the relative humidity of the space between the nozzle of the ink jet head and the recording medium was adjusted to be in the conditions shown in Table 3 to Table 6.

(Evaluation of Blur)

The character and the void character printed on the prepared image were visually observed, and blur was evaluated by the following standards.

⊙: All characters can be reproduced without nay collapse of the details

○: The collapse of the details was observed in the character of 5 points, but the character was sufficiently readable, and the character and the void character of 7 points were reproduce without any collapse of the details X: The collapse of the details was observed in the character or the void character of 7 points (Evaluation of Crack)

In the solid image of the prepared image, the presence or absence of a cleavage in the drying process was visually observed. When the cleavage was confirmed, the size of the cleavage was measured. The evaluation was performed by the following standards on the basis of the results described above.

⊙: No cleavage was observed in the drying process

○: A fine cleavage of less than or equal to 0.5 mm was observed in the drying process Δ: A cleavage of greater than 0.5 mm and less than 2 mm was observed in the drying process X: A cleavage of greater than or equal to 2 mm was observed in the drying process The evaluation results of the blur and the adhesiveness are shown in Table 3 to Table 6.

TABLE 3

Printing Conditions and Evaluation Results of Images Nos. 1 to 14

| | | Base Material after Treatment | | | | Printing Condition | | | |
|---|---|---|---|---|---|---|---|---|---|
| | | | Attachment | | | | | | |
| Image No. | Treatment Liquid No. | Amount of Resin (g/m$^2$) | Malonic Acid (g/m$^2$) | Calcium Chloride (g/m$^2$) | Ink No. | Relative Humidity (%) | Transport Velocity (m/min) | Evaluation Blur | Crack |
| 1 | 1 | 2 | 0.4 | 0 | 1 | 75 | 50 | ◎ | ◎ |
| 2 | 10 | 2 | 0 | 0.2 | 1 | 75 | 50 | ◎ | ◎ |
| 3 | 1 | 2 | 0.4 | 0 | 2 | 75 | 50 | ◎ | ◎ |
| 4 | 10 | 2 | 0 | 0.2 | 2 | 75 | 50 | ◎ | ◎ |
| 5 | 1 | 2 | 0.4 | 0 | 3 | 75 | 50 | ◎ | ◎ |
| 6 | 10 | 2 | 0 | 0.2 | 3 | 75 | 50 | ◎ | ◎ |
| 7 | 1 | 2 | 0.4 | 0 | 4 | 75 | 50 | ◎ | ○ |
| 8 | 10 | 2 | 0 | 0.2 | 4 | 75 | 50 | ◎ | ○ |
| 9 | 1 | 2 | 0.4 | 0 | 5 | 75 | 50 | ○ | ◎ |
| 10 | 10 | 2 | 0 | 0.4 | 5 | 75 | 50 | ○ | ◎ |
| 11 | 1 | 2 | 0.4 | 0 | 6 | 75 | 50 | ○ | ○ |
| 12 | 1 | 1 | 0.2 | 0 | 6 | 75 | 50 | ○ | ○ |
| 13 | 1 | 3 | 0.6 | 0 | 6 | 75 | 50 | ○ | ○ |
| 14 | 1 | 10 | 2 | 0 | 6 | 75 | 50 | ○ | ○ |

TABLE 4

Printing Conditions and Evaluation Results of Images Nos. 15 to 27

| | | Base Material after Treatment | | | | Printing Condition | | | |
|---|---|---|---|---|---|---|---|---|---|
| | | | Attachment | | | | | | |
| Image No. | Treatment Liquid No. | Amount of Resin (g/m$^2$) | Malonic Acid (g/m$^2$) | Calcium Chloride (g/m$^2$) | Ink No. | Relative Humidity (%) | Transport Velocity (m/min) | Evaluation Blur | Crack |
| 15 | 3 | 2 | 0.4 | 0 | 6 | 75 | 50 | ○ | ○ |
| 16 | 5 | 2 | 0.4 | 0 | 6 | 75 | 50 | ○ | ○ |
| 17 | 4 | 2 | 0.4 | 0 | 6 | 75 | 50 | ○ | ○ |
| 18 | 6 | 2 | 0.4 | 0 | 6 | 75 | 50 | ○ | ○ |
| 19 | 7 | 2 | 0.4 | 0 | 6 | 75 | 50 | ○ | ○ |
| 20 | 1 | 2 | 0.4 | 0 | 6 | 75 | 25 | ○ | ○ |
| 21 | 1 | 2 | 0.4 | 0 | 6 | 75 | 30 | ○ | ○ |
| 22 | 1 | 2 | 0.4 | 0 | 6 | 75 | 45 | ○ | ○ |
| 23 | 1 | 2 | 0.4 | 0 | 6 | 75 | 70 | ○ | ○ |
| 24 | 1 | 2 | 0.4 | 0 | 6 | 75 | 90 | ○ | ○ |
| 25 | 1 | 2 | 0.4 | 0 | 6 | 75 | 100 | ○ | ○ |
| 26 | 1 | 2 | 0.4 | 0 | 6 | 75 | 150 | ○ | ○ |
| 27 | 1 | 2 | 0.4 | 0 | 6 | 75 | 200 | ○ | ○ |

TABLE 5

Printing Conditions and Evaluation Results of Images Nos. 28 to 42

| | | Base Material after Treatment | | | | Printing Condition | | | |
|---|---|---|---|---|---|---|---|---|---|
| | | | Attachment | | | | | | |
| Image No. | Treatment Liquid No. | Amount of Resin (g/m2) | Malonic Acid (g/m2) | Calcium Chloride (g/m2) | Ink No. | Relative Humidity (%) | Transport Velocity (m/min) | Evaluation Blur | Crack |
| 28 | 1 | 2 | 0.4 | 0 | 6 | 50 | 50 | ○ | ○ |
| 29 | 1 | 2 | 0.4 | 0 | 6 | 60 | 50 | ○ | ○ |
| 30 | 1 | 2 | 0.4 | 0 | 6 | 80 | 50 | ○ | ○ |
| 31 | 1 | 2 | 0.4 | 0 | 6 | 95 | 50 | ○ | ○ |
| 32 | 1 | 2 | 0.4 | 0 | 7 | 75 | 50 | ○ | ○ |

TABLE 5-continued

Printing Conditions and Evaluation Results of Images Nos. 28 to 42

| | | Base Material after Treatment | | | | Printing Condition | | | |
| | | Attachment | | | | | | | |
| Image No. | Treatment Liquid No. | Amount of Resin (g/m2) | Malonic Acid (g/m2) | Calcium Chloride (g/m2) | Ink No. | Relative Humidity (%) | Transport Velocity (m/min) | Evaluation Blur | Crack |
|---|---|---|---|---|---|---|---|---|---|
| 33 | 3  | 2   | 0.4  | 0   | 7 | 75 | 50 | ○ | ○ |
| 34 | 6  | 2   | 0.4  | 0   | 7 | 75 | 50 | ○ | ○ |
| 35 | 10 | 2   | 0    | 0.2 | 6 | 75 | 50 | ○ | ○ |
| 36 | 1  | 0.2 | 0.04 | 0   | 1 | 75 | 50 | ○ | Δ |
| 37 | 1  | 0.5 | 0.1  | 0   | 1 | 75 | 50 | ○ | ○ |
| 38 | 1  | 1   | 0.2  | 0   | 1 | 75 | 50 | ○ | ○ |
| 39 | 1  | 3   | 0.6  | 0   | 1 | 75 | 50 | ○ | ○ |
| 40 | 1  | 5   | 1    | 0   | 1 | 75 | 50 | ○ | ○ |
| 41 | 1  | 8   | 1.6  | 0   | 1 | 75 | 50 | ○ | ○ |
| 42 | 1  | 12  | 2.4  | 0   | 1 | 75 | 50 | ○ | ○ |

TABLE 6

Printing Conditions and Evaluation Results of Images Nos. 43 to 50

| | | Base Material after Treatment | | | | Printing Condition | | | |
| | | Attachment | | | | | | | |
| Image No. | Treatment Liquid No. | Amount of Resin (g/m2) | Malonic Acid (g/m2) | Calcium Chloride (g/m2) | Ink No. | Relative Humidity (%) | Transport Velocity (m/min) | Evaluation Blur | Crack |
|---|---|---|---|---|---|---|---|---|---|
| 43 | 1 | 2 | 0.4 | 0 | 1 | 45 | 50  | x | — |
| 44 | 1 | 2 | 0.4 | 0 | 1 | 97 | 50  | — | — |
| 45 | 8 | 2 | 0   | 0 | 1 | 75 | 50  | x | — |
| 46 | 9 | 0 | 0.4 | 0 | 1 | 75 | 50  | — | — |
| 47 | 1 | 2 | 0.4 | 0 | 1 | 45 | 45  | x | — |
| 48 | 1 | 2 | 0.4 | 0 | 1 | 45 | 50  | x | — |
| 49 | 1 | 2 | 0.4 | 0 | 1 | 45 | 75  | x | — |
| 50 | 1 | 5 | 1   | 0 | 1 | 45 | 100 | x | — |

In images Nos. 1 to 42 formed by the method of the present invention, blur hardly occurred. In particular, in the images Nos. 1 to 10 having the highest mass ratio of polyhydric alcohols in the mass of the organic solvent contained in the ink jet recording ink, blur more hardly occurred. In addition, in the images Nos. 1 to 6 in which the content of the organic solvent was greater than or equal to 10 mass % and less than or equal to 40 mass % of the total mass of the ink jet recording ink, a crack hardly occurred on the image. In addition, even in the images Nos. 21 to 27 in which the transport velocity of the recording medium was greater than or equal to 30 m/min at a linear velocity, blur hardly occurred. In addition, in the images Nos. 1 to 35, and 37 to 42 in which the attachment amount of the resin was greater than or equal to 0.3 g/m², a crack more hardly occurred. In addition, even though it is not shown in the tables, in the images Nos. 1 to 41 in which the attachment amount of the resin was less than or equal to 11 g/m², the recording medium was capable of being easily wound, and in the images Nos. 1 to 39 in which the attachment amount of the resin was less than or equal to 3 g/m², the texture of the thin film was not impaired, and thus, the images Nos. 1 to 39 were more preferable as the printed material for soft packaging application.

In contrast, in the images Nos. 43, and 47 to 50 in which the relative humidity was less than 50%, blur greatly occurred on the image. It is considered that this is because humidity was low, and the resin did not sufficiently swell or was not sufficiently dissolved, and thus, the pigment aggregating agent was not sufficiently dissolved and diffused in the ink jet recording ink, and the pigment was not sufficiently aggregated and fixed.

In the image No. 44 in which the relative humidity was higher than 95%, dew condensation occurred in the device, and thus, the image formation was cancelled in order to prevent the failure of the device.

In the image No. 45 in which the pigment aggregating agent was attached to the recording medium, blur greatly occurred on the image. It is considered that this is because the pigment was not sufficiently aggregated and fixed.

In the image No. 46 in which the resin was attached to the recording medium, the pigment aggregating agent was precipitated, and thus, the image formation was cancelled.

The present application is an application claiming priority based on Japanese Patent Application No. 2015-205444 filed on Oct. 19, 2015, and the contents of the claims and the description of the application are incorporated in the present application.

INDUSTRIAL APPLICABILITY

According to the ink jet image forming method of the present invention, it is possible to form an image with less blur by an aqueous ink. For this reason, the present invention is expected to increase the width of the application of the aqueous ink according to the ink jet method, and to contribute to the development and the spread of the technology in this field. In addition, according to the ink jet image forming method of the present invention, even in a case where an image is formed on a thin film, the texture of the film is not impaired, and thus, the ink jet image can be preferably performed as the printed material for soft packaging application.

The invention claimed is:

1. An ink jet image forming method comprising:
an image forming step of ejecting and impacting an ink jet recording ink containing at least a pigment, an organic solvent, and water onto a region of low water-absorption recording medium, in which a resin and a pigment aggregating agent are attached to a surface, from a nozzle of an ink jet head,
characterized in that, in the image forming step, relative humidity of a space between the nozzle and the recording medium is adjusted to be greater than or equal to 50% and less than or equal to 95%,
wherein the ink jet recording ink contains two or more types of organic solvents, a mass ratio of polyhydric alcohols with respect to the total mass of the organic solvent is higher than a mass ratio of the other organic solvents,
wherein the recording medium is adjusted by using a humidifying unit comprising a supply port for supplying humidified air to the space between the nozzle and the recording medium, an exhaust port for discharging the humidified air from the space between the nozzle and the recording medium, and a humidity sensor for measuring the relative humidity in the space between the nozzle and the recording medium, and
wherein the humidity sensor has a feedback function for feeding back the measured relative humidity to the humidifying unit.

2. The method according to claim 1,
wherein the mass of the organic solvent contained in the ink jet recording ink is greater than or equal to 10 mass % and less than or equal to 40 mass % of the total mass of the ink jet recording ink.

3. The method according to claim 1,
wherein the pigment aggregating agent is an acid or a polyvalent metal salt.

4. The method according to claim 1,
wherein in the region in which the resin and the pigment aggregating agent are attached to the surface, an attachment amount of the resin is greater than or equal to 0.3 g/m$^2$ and less than or equal to 11.0 g/m$^2$.

5. The method according to claim 1,
wherein in the region in which the resin and the pigment aggregating agent are attached to the surface, the attachment amount of the resin is greater than or equal to 0.3 g/m$^2$ and less than or equal to 3.0 g/m$^2$.

6. The method according to claim 1,
wherein the resin is a cationic resin or a nonionic resin.

7. The method according to claim 1,
wherein in the image forming step, a transport velocity of the recording medium is greater than or equal to 30 m/min and less than or equal to 200 m/min at a linear velocity.

8. The method according to claim 1,
wherein in the image forming step, an image is formed by a single-path method.

9. The method according to claim 1,
wherein the recording medium is a non-water-absorption film.

10. The method according to claim 9,
wherein the recording medium is a film subjected to antifogging processing.

11. The method according to claim 1, further comprising:
a resin aggregating agent applying step of attaching a treatment liquid containing a resin, a pigment aggregating agent, and water to the recording medium, and of forming a region in which the resin and the pigment aggregating agent are attached to a surface.

12. The method according to claim 11,
wherein the treatment liquid is attached to the recording medium in a roll coating mode.

13. The method according to claim 11, further comprising:
a drying step of drying the formed region in which the resin and the pigment aggregating agent are attached to the surface, before the image forming step and after the resin. aggregating agent applying step.

14. The method according to claim 1,
wherein the mass of the organic solvent contained in the ink jet recording ink is greater than or equal to 10 mass % and less than or equal to 40 mass % of the total mass of the ink jet recording ink.

15. The method according to claim 1,
wherein the pigment aggregating agent is an acid or a polyvalent metal salt.

16. The method according to claim 1,
wherein in the region in which the resin and the pigment aggregating agent are attached to the surface, an attachment amount of the resin is greater than or equal to 0.3 g/m$^2$ and less than or equal to 11.0 g/m$^2$.

17. The method according to claim 1,
wherein in the region in which the resin and the pigment aggregating agent are attached to the surface, the attachment amount of the resin is greater than or equal to 0.3 g/m$^2$ and less than or equal to 3.0 g/m$^2$.

18. The method according to claim 1,
wherein the resin is a cationic resin or a nonionic resin.

19. The method according to claim 1,
wherein in the ejecting and impacting, a transport velocity of the recording medium is greater than or equal to 30 m/min and less than or equal to 200 m/min at a linear velocity.

* * * * *